UNITED STATES PATENT OFFICE.

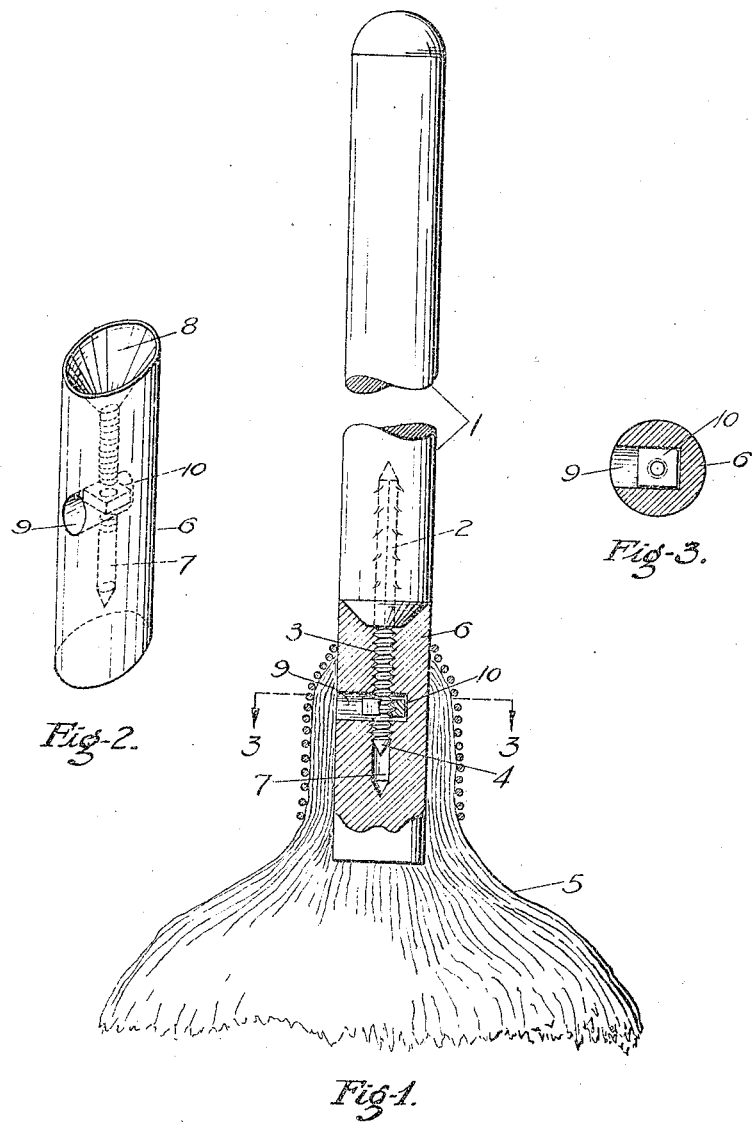

WILLIAM M. WARNER, OF HAIRSTON, ALABAMA.

BROOM.

1,179,057.  Specification of Letters Patent.  Patented Apr. 11, 1916.

Application filed September 7, 1915. Serial No. 49,398.

*To all whom it may concern:*

Be it known that I, WILLIAM M. WARNER, a citizen of the United States of America, residing at Hairston, in the county of Green and State of Alabama, have invented certain new and useful Improvements in Brooms, of which the following is a specification.

My invention relates to an improvement in brooms, having for its object to make the handle detachable from the broom head.

According to my preferred arrangement, the broom straw is attached to a head formed by a short handle section which is longitudinally drilled or bored through part of its length to provide for the reception of a fastening screw in the end of the handle which is adapted to be screwed through the bore of the broom head and held positively therein against stripping by screwing it through a nut driven through a lateral bore in the broom head. The screw is preferably provided with a squared, burred shank which is driven into or otherwise made fast in the handle, and the broom head and handle are shaped to make a taper fit to give a rigid joint when driven together by said screw. It will be understood however that my invention contemplates the provision of any suitable threaded member on the handle portion proper and which is adapted for threaded engagement with the broom head or the handle portion connected thereto.

In the accompanying drawings which illustrate only the preferred embodiment of my invention: Figure 1 shows the broom in elevation with its handle sections interlocked. Fig. 2 shows the short broom head section of the handle in perspective. Fig. 3 is a sectional view taken on the line 3—3 of Fig. 1.

Similar reference numerals refer to similar parts throughout the drawings.

As illustrated, the broom comprises a handle 1 having fast in its lower end the square, elongated shank 2 of a screw 3 which has coarse threads and a taper point 4. The broom straw 5 is attached in any well known manner to a broom head 6 formed by a short handle portion which is provided with an elongated center hole or bore 7 extending from its upper end to a point near, but not through its lower end. In order to provide the head 6 with what I regard the most satisfactory means for interlocking it with the threaded shank, the hole 7 is counter-bored at its upper end to form a taper socket 8 and I bore a lateral socket 9 from one side part way through the head. The axes of the bores 7 and 9 intersect. A nut 10 is driven into the socket 9 until its threaded opening is concentric with the bore 7. The lower end of the handle 1 is tapered at 11 to fit snugly into the taper bore 8 in the head 6. The nut is adapted for threaded engagement with the screw 3 and by engaging the latter I provide an effective rigid and cheap detachable taper joint between the handle and the head, and if the nut should be slightly off center with the bore 7 it will be adjusted by the taper point 4 which will work its way into the nut if any where near position. This arrangement permits the shipping of brooms knocked down and the continued use of a handle.

Having thus described my invention, what I claim as new and desire to secure by Letters Patent, is:—

1. In a broom, the combination with a handle having a threaded metal shank fast in its lower end, a broom head forming a handle portion and having a longitudinal bore part way therethrough, a nut inserted in said head at an intermediate point in said bore and held against rotation, said nut being adapted for threaded engagement with said shank to detachably connect the head and handle portion, substantially as described.

2. The combination with a broom head and handle, of a threaded shank fast to one part, a nut introduced laterally into the other part which has a bore concentric with the nut's threaded opening, said shank and nut being adapted for threaded engagement to detachably fasten the handle and head, the meeting ends of said head and handle being tapered to form a taper joint, and a pointed tip on the lower end of said shank to center it relatively to the said nut, substantially as described.

In testimony whereof I affix my signature.

WILLIAM M. WARNER.

Witness:
  NOMIE WELSH.